United States Patent
Gurin et al.

(10) Patent No.: US 8,641,020 B2
(45) Date of Patent: Feb. 4, 2014

(54) SYSTEM FOR DISSOLVING GASES IN FUEL

(71) Applicant: Helpful Technologies, Inc., Hollywood, FL (US)

(72) Inventors: Victor Gurin, Hilton, NY (US); Mindaugas Macijauskas, Boca Raton, FL (US); Serguei Permiakov, Kinata (CA); Pavel Pikul, Rochester, NY (US); Mark Goltsman, Rochester, NY (US)

(73) Assignee: Mark W. Baehr, Dallas, TX (US)

( * ) Notice: Subject to any disclaimer, the term of this patent is extended or adjusted under 35 U.S.C. 154(b) by 0 days.

(21) Appl. No.: 13/766,937

(22) Filed: Feb. 14, 2013

(65) Prior Publication Data

US 2013/0187298 A1 Jul. 25, 2013

Related U.S. Application Data

(63) Continuation of application No. PCT/US2013/022575, filed on Jan. 22, 2013.

(60) Provisional application No. 61/589,363, filed on Jan. 22, 2012.

(51) Int. Cl.
*B01F 3/04* (2006.01)
*F02M 29/06* (2006.01)

(52) U.S. Cl.
USPC .................. 261/79.1; 261/79.2; 261/DIG. 27

(58) Field of Classification Search
USPC .............. 123/525; 261/36.1, 78.1, 78.2, 79.1, 261/79.2, DIG. 27
See application file for complete search history.

(56) References Cited

U.S. PATENT DOCUMENTS

| | | | | | |
|---|---|---|---|---|---|
| 1,456,135 | A | * | 5/1923 | Lidholm et al. | 48/189.4 |
| 1,756,805 | A | * | 4/1930 | Baker | 261/79.1 |
| 1,867,742 | A | * | 7/1932 | Hawley | 261/79.1 |
| 2,843,368 | A | * | 7/1958 | Schmidt | 261/79.1 |
| 3,036,564 | A | * | 5/1962 | Guiot | 123/457 |
| 3,336,017 | A | * | 8/1967 | Kopa | 261/128 |
| 3,395,899 | A | * | 8/1968 | Kopa | 261/22 |
| 3,512,359 | A | * | 5/1970 | Pierce | 60/748 |
| 3,667,221 | A | * | 6/1972 | Taylor | 60/737 |
| 3,933,450 | A | * | 1/1976 | Percevaut | 96/319 |
| 4,130,099 | A | * | 12/1978 | Ferguson | 123/590 |

(Continued)

FOREIGN PATENT DOCUMENTS

| | | | | | |
|---|---|---|---|---|---|
| JP | 54-60622 | A | * | 5/1979 | 261/79.1 |
| RU | 2129662 | C1 | * | 4/1999 | |

OTHER PUBLICATIONS

International Search Report for international application No. PCT/US2013/022575 mailed on May 14, 2013.

(Continued)

*Primary Examiner* — Richard L Chiesa
(74) *Attorney, Agent, or Firm* — Abraham Hershkovitz; Hershkovitz & Associates, PLLC

(57) ABSTRACT

A system for gasification of liquid fuel includes an absorber to receive liquid fuel and as through separate ports, a vortex reactor to create a vortex of the gas and fuel droplets to enhance absorption of gas into the fuel, and a recirculation loop to remove and recirculate unabsorbed gas and fuel vapors from the absorber back to its tangential inlet port. Gasified fuel collects at the bottom of the absorber for delivery to an engine.

12 Claims, 3 Drawing Sheets

(56) References Cited

U.S. PATENT DOCUMENTS

| | | | |
|---|---|---|---|
| 4,371,382 A * | 2/1983 | Ross | 210/788 |
| 4,734,109 A * | 3/1988 | Cox | 95/189 |
| 6,273,072 B1 * | 8/2001 | Knapstein et al. | 123/527 |
| 6,820,864 B2 * | 11/2004 | Amou et al. | 261/78.1 |
| 7,111,829 B2 * | 9/2006 | DeLisle | 261/78.1 |
| 7,261,094 B2 * | 8/2007 | Gurin | 123/531 |
| 7,406,955 B1 * | 8/2008 | Gachik et al. | 123/522 |
| 7,500,464 B2 | 3/2009 | Rock et al. | |
| 7,523,747 B2 * | 4/2009 | Gachik et al. | 123/525 |
| 7,547,002 B2 * | 6/2009 | Mao et al. | 261/78.1 |
| 8,037,849 B1 * | 10/2011 | Staroselsky et al. | 123/1 A |
| 8,074,895 B2 * | 12/2011 | Mao et al. | 239/102.2 |
| 2007/0204839 A1 | 9/2007 | Rock et al. | |
| 2008/0121736 A1 * | 5/2008 | Mao et al. | 239/102.2 |
| 2009/0078226 A1 | 3/2009 | Gachik et al. | |
| 2010/0181231 A1 | 7/2010 | Gurin | |
| 2010/0192906 A1 | 8/2010 | Johnson | |

OTHER PUBLICATIONS

Written Opinion of the International Search Authority for international application No. PCT/US2013/022575 mailed on May 14, 2013.

* cited by examiner

Section A - A

SYSTEM FOR DISSOLVING GASES IN FUEL

CROSS-REFERENCE TO RELATED APPLICATION

This is a continuation of International Application PCT/US2013/22575 with an international filing date of Jan. 22, 2013, which is with Provisional Application No. 61/589,363 filed on Jan. 22, 2012, the contents of which are incorporated herein by reference thereto.

FIELD OF THE INVENTION

The system of this invention relates to treatment of fuel for internal combustion engines, and more specifically to gasification of such fuel for improved combustion.

BACKGROUND OF THE INVENTION

Methods and means for dissolving gases into liquid fuel for an engine combustion chamber are known in the prior art. One method is to dissolve gas at high pressure into a thin film of fuel. It was described in U.S. Pat. No. 7,011,048 dated Mar. 14, 2006. Another method is to direct high pressure gas into the smallest possible droplets of liquid fuel. The use of nozzles to disperse fuel is described in Russian Pat. 2129662 dated Feb. 2, 1998, U.S. Pat. No. 7,261,094 dated Aug. 28, 2007, U.S. Pat. No. 7,406,955 dated Aug. 5, 2008, U.S. Pat. No. 7,523,747 dated Apr. 28, 2009, and U.S. Pat. No. 8,037,849 dated Oct. 18, 2011. U.S. Pat. No. 6,273,072, dated Aug. 14, 2001 discloses methods of using both nozzles and a thin film of fuel.

These prior art systems require special devices for operation within limited parameter ranges, and under certain conditions, to provide a fuel/gas solution to a combustion chamber in proper condition. In practice it is difficult to satisfy both of these requirements simultaneously, and the achieved effect is not stable at varying loads.

SUMMARY OF THE INVENTION

In summary, this invention is a system for gasification of liquid fuel. It includes an absorber to receive liquid fuel and gas through separate ports, a vortex reactor to create a vortex of the gas and fuel droplets to enhance absorption of gas into the fuel, and a recirculation loop to remove and recirculate unabsorbed gas and fuel vapors from the absorber reactor back to the tangential inlet port. Gas/fuel solution collects at the bottom of the vessel for delivery to an engine.

This invention comprises an absorber apparatus for gasification of a liquid fuel, comprising:
a) an absorber body adapted to receive liquid fuel and gas through separate ports into a mixing chamber of the absorber apparatus for absorption of the gas into the liquid fuel;
b) a vortex forming system adapted to generate a vortex of the gas and fuel droplets in the mixing chamber to maximize surface contact of the gas and the droplets;
c) an evacuation tube to remove and recirculate unabsorbed gas and fuel vapors from the mixing chamber;
d) a reservoir in the absorber body to collect gas/fuel solution generated in the absorber body; and
e) a control valve to control the level of the gas/fuel solution in the reservoir.

The liquid fuel is gasoline, diesel fuel, aviation fuel, marine diesel oil, marine heavy fuel oil, or biodiesel and the gas to be dissolved in the liquid fuel is an air, oxygen, carbon dioxide, combustion exhaust, or natural gas, or mixtures thereof.

The vortex system includes a vortex reactor within the mixing chamber, the vortex reactor having a plurality of swirl vanes responsive to gas directed tangentially into the vortex reactor to generate the vortex around a central evacuating tube in the mixing chamber and the liquid fuel is introduced into the mixing chamber adjacent to the center of the vortex system.

The absorber further comprises an evacuation tube comprising a central tube extending up through the mixing chamber for removal of free gas and fuel vapors therefrom, and a recirculating line to convey the free gas and fuel vapors to the gas tangential inlet port.

The absorber further includes a blower to direct a recirculating stream of the gas through a tangential gas port into the vortex reactor to the vortex reactor swirl vanes. The recirculation line may include a bleed line to deliver a part of the recirculation gases to an air intake duct of the internal combustion chamber.

The absorber further comprises an outlet port at the bottom thereof for passage there through of gas/fuel solution to an internal combustion engine. The control valve comprises a float level sensor, which is installed inside the absorber body or in another place of an engine fuel solution supply system.

The following detailed description illustrates the invention by way of example and not by way of limitation. This description will clearly enable one skilled in the art to make and use the invention, and describes several embodiments, adaptations, variations, alternatives and uses of the invention, including what we presently believe is the best mode of carrying out the invention. As various changes could be made in the above constructions without departing from the scope of the invention, it is intended that all matter contained in the above description or shown in the accompanying drawings shall be interpreted as illustrative and not in a limiting sense.

DETAIL DESCRIPTION

Figure 1:
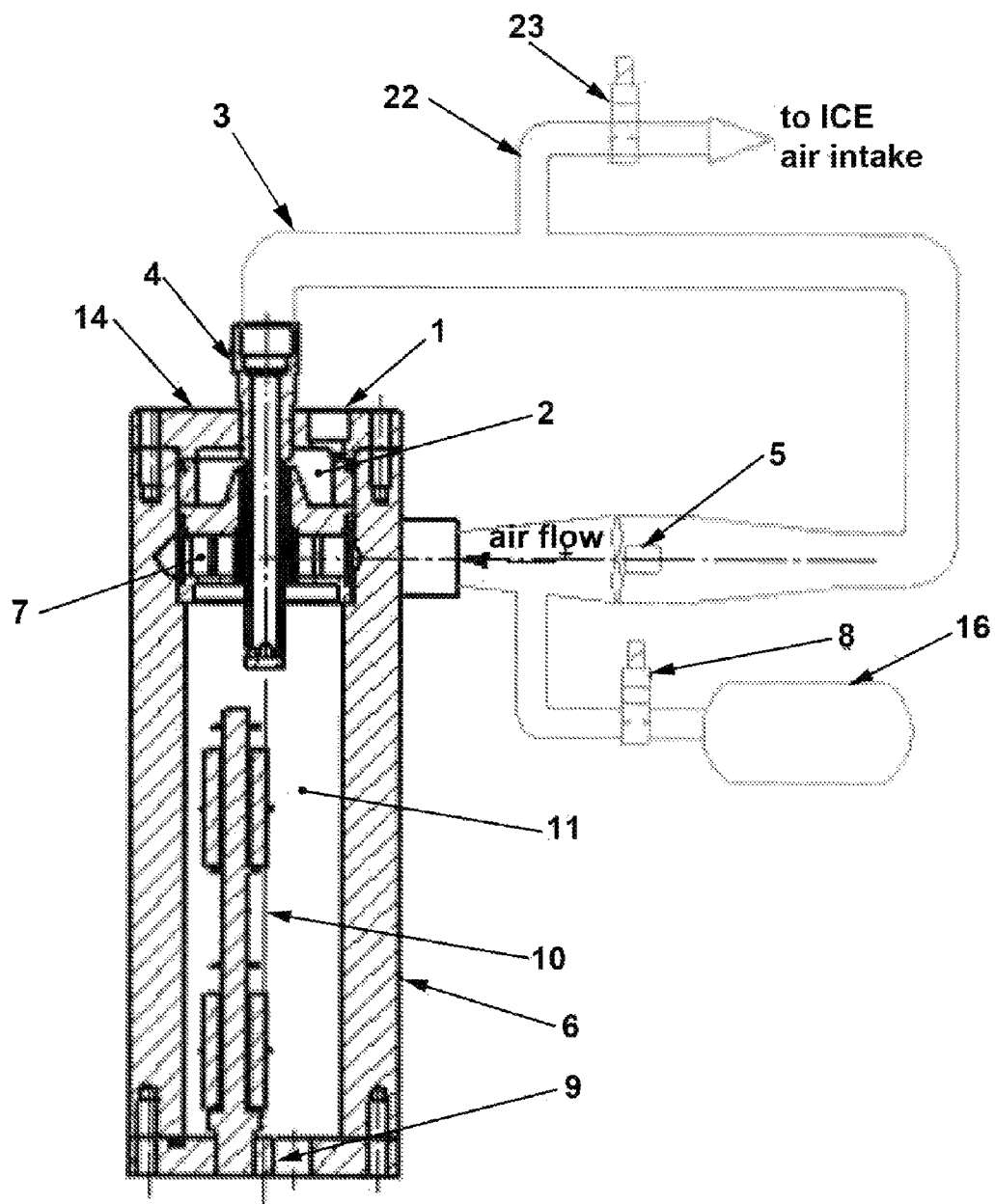
FIG. 1 is a sectional elevation view of an absorber apparatus according to this invention.
Figure 2:
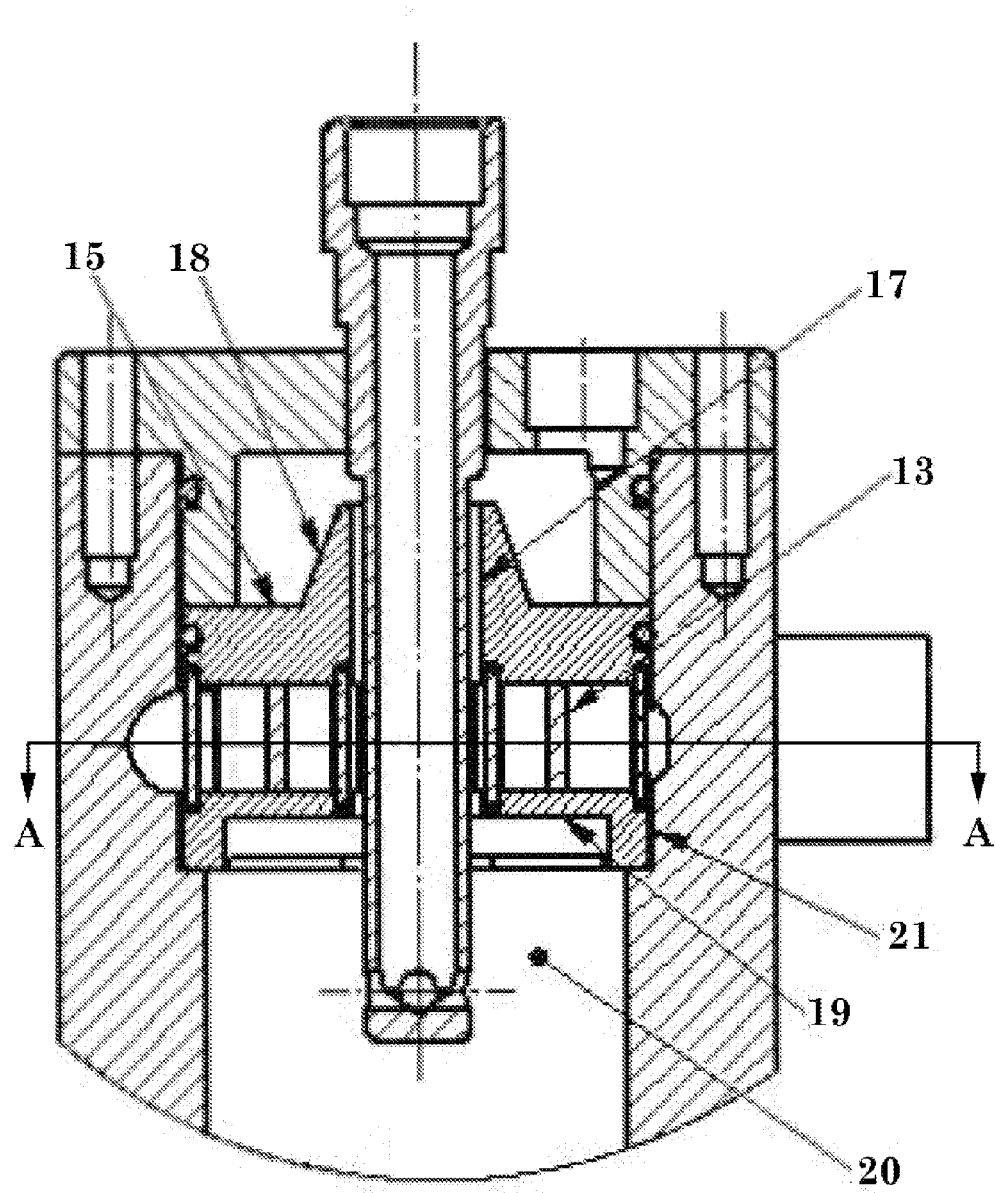
FIG. 2 is an enlarged detail view of the upper portion of FIG. 1.
Figure 3:
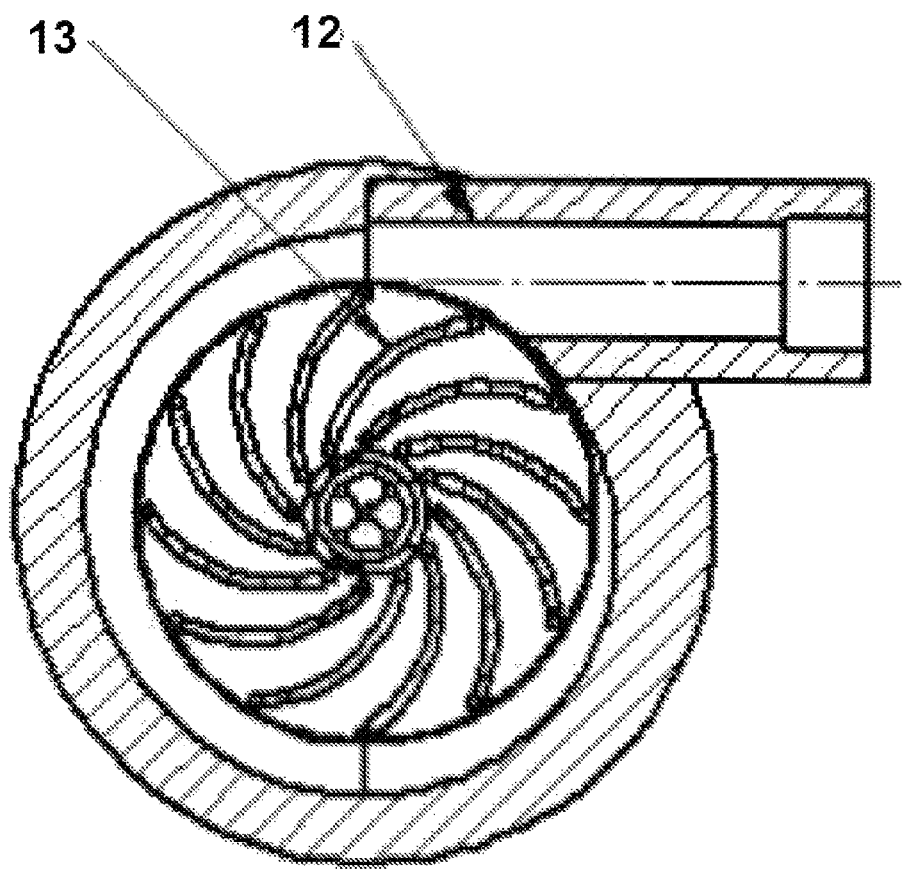
FIG. 3 is a sectional plan view on the plane A-A of FIG. 2.

Referring to the drawing figures, a liquid fuel absorber apparatus includes a cylindrical absorber body 6 with a tangential inlet port 12 through the body wall into its interior chamber. The flow axis of the tangential inlet port 12 coincides with the central horizontal plane of a vortex reactor 7. Gas entering the reactor 7 at high speed passes through swirl vanes 13 generating a gas vortex within the absorber 6.

Engine fuel passes through an inlet port 1 in the top cap 14 of the absorber body 6, into a fuel space 2 between the top cap 14 and vortex reactor top plate 15. The top plate 15 has a raised border 18 around its central bore. Fuel from the fuel space 2 overflowing this raised border 18 "leaks" through the thin annular gap 17 between the raised border 18 and an evacuating tube 4 (which extends from within the absorber body 6) to the middle of the vortex reactor 7, where gas from the swirl vanes 13 creates the vortex around the evacuating tube 4. This vortex disperses fuel droplets within a mixing chamber 20 in the absorber body 6.

Swirled gas and dispersed fuel combine in a suspension or cloud in the mixing chamber 20 below the vortex reactor 7. The cloud is in constant rotary movement, a vortex in the mixing chamber 20 under the vortex reactor bottom plate 19.

Gas is absorbed in the fuel droplets. Fuel droplets with absorbed gas gravitate to the bottom of the absorber body 6 in the area 11. From there it is delivered through an outlet port 9 to an internal combustion engine (ICE). A float level sensor 10 senses the filling level of the bottom portion of the absorber body 6 and controls a feeding fuel pump operation (not shown) through an electronic control (not shown). The gas which is not absorbed in the fuel is conveyed through the central evacuating tube 4 to a closed loop line 3 for recirculation back to the absorber body 6 tangential inlet port 12. A fan 5 in the closed loop line 3 moves the gas from line 3 into the inlet port 12. The fan 5 creates a certain air speed to provide conditions to generate a vortex around evacuating tube 4 in the area 20. New fresh gas is delivered, from an external source 16 and control valve 8, into the closed loop line 3 between the fan 5 and the inlet port 12 to replace the gas which has been absorbed into the fuel and delivered to the ICE. Fuel droplets and gas also move through gap 21 and come back to the middle of the vortex reactor. A portion of the recirculating gas may be taken from in the closed loop line 3 and fed to the ICE air intake duct through a bleed line 22 and control valve 23.

The required fuel-air mixture for a particular engine is dependent upon various conditions such as the engine regime, ambient temperature, pressure, the nature of the fuel used and such like. It is a further feature of certain embodiments of the present invention that the degree of air-saturation in the vortex reactor may be controlled by an electronic control module to suit requirements.

Furthermore, embodiments of the vortex reactor system of this invention may be adapted to form mixtures comprising gases other than air, such as methane, hydrogen, carbon dioxide and the like. Moreover, where suitable, multiple gases may be introduced independently through a plurality of gas-inlets.

In accordance with another embodiment, the present invention is directed to a method for mixing gases and liquids, said method comprising the steps of (a) providing a reservoir and a vortex reactor forming a part of the reservoir; step (b) introducing at least one gas and at least one liquid into the vortex reactor; and step (c) impregnating the liquid with gas; and step d) sending the liquid with impregnated gas into the body of the reservoir.

It is noted that methods for mixing gasses and liquids according to various embodiments of the invention may be used in a variety of applications including but not limited to internal combustion engines described herein. Other applications include the production of gassed beverages in which gases typically carbon dioxide, are dissolved into an aqueous solution, spray painting, fuel supply systems for jet engines, and petrochemical industry. Still further applications will occur to the skilled practitioner.

The foregoing description of a preferred embodiment is illustrative. The concept and scope of the invention are not limited by details of its description, but only by the following claims.

In the following claims, any terms indicative of orientation (e.g. front, back, left, right, upper, lower; horizontal, vertical) are meant to correspond with the illustrations as an aid to understanding of the claimed invention. Such terms are not intended as positive limitations.

The scope of the present invention is defined by the appended claims and includes both combinations and sub combinations of the various features described hereinabove as well as variations and modifications thereof, which would occur to persons skilled in the art upon reading the foregoing description.

In the claims, the word "comprise", and variations thereof such as "comprises", "comprising" and the like indicate that the components listed are included, but not generally to the exclusion of other components.

In view of the above, it will be seen that the several objects and advantages of the present invention have been achieved and other advantageous results have been obtained.

What is claimed is:

1. A method for impregnating liquids with gases, said method comprising:
   (a) providing a reservoir with a cap and a vortex reactor with a plate forming a part of the reservoir;
   (b) introducing at least one gas into the vortex reactor providing swirl movement therein;
   (c) introducing at least one liquid into the vortex reactor from the reservoir cap to flow through an annular gap formed by a raised border around a central bore in the vortex reactor plate and an evacuating tube;
   (d) impregnating the liquid with gas; and
   (e) sending the liquid with impregnated gas into a lower part of the reservoir.

2. An absorber apparatus for gasification of a liquid fuel, comprising:
   (a) an absorber body adapted to receive liquid fuel and gas through separate ports into a mixing chamber of the absorber apparatus for absorption of the gas into the liquid fuel;
   (b) a vortex forming system adapted to generate a vortex of the gas and fuel droplets in the mixing chamber to maximize surface contact of the gas and the droplets;
   (c) an evacuation tube to remove and recirculate unabsorbed gas and fuel vapors from the mixing chamber;
   (d) a fuel space formed between a cap and a vortex reactor plate to receive a liquid fuel to be contacted with gases wherein the plate has a raised border around a cap central bore and fuel from the fuel space leaks through an annular gap between the raised border and an evacuating tube into a vortex zone of the absorber body;
   (e) a reservoir in a lower part of the absorber body to collect gasified fuel generated in the absorber body; and
   (f) level sensors to control the level of the gasified fuel in the reservoir.

3. The absorber according to claim 2, wherein the liquid fuel is one of gasoline, diesel fuel, aviation fuel, marine diesel oil, marine heavy fuel oil, biodiesel, or mixtures thereof.

4. The absorber according to claim 2, wherein the gas to be dissolved in the liquid fuel is one of air, oxygen, carbon dioxide, combustion exhaust, natural gas, or mixtures thereof.

5. The absorber according to claim 2, wherein the vortex forming system includes a vortex reactor within the mixing chamber, the vortex reactor having a plurality of swirl vanes responsive to gas directed tangentially into the vortex reactor to generate the vortex around the central evacuation tube in the mixing chamber.

6. The absorber according to claim 5, wherein the liquid fuel is introduced into the mixing chamber adjacent to the center of the vortex system.

7. The absorber according to claim 2, wherein the evacuation tube includes a central tube extending up through the mixing chamber for removal of free gas and fuel vapors therefrom, and a recirculating line to convey the free gas and fuel vapors to a gas tangential inlet port.

8. The absorber according to claim 7, further including a blower to direct a recirculating stream of the gas through the tangential gas port into the vortex reactor to vortex reactor swirl vanes.

9. The absorber according to claim 7, wherein the recirculating line includes a bleed line to deliver a part of the recirculation gases to an air intake duct of an internal combustion chamber.

10. The absorber according to claim 2, wherein the absorber further comprises an outlet port at the bottom thereof for passage therethrough of gasified fuel to an internal combustion engine.

11. The absorber according to claim 2, wherein the level sensors comprises a float level sensor, which is installed inside the absorber body or in another place of an engine fuel solution supply system.

12. An absorber apparatus for gasification of a liquid fuel, the absorber apparatus comprising:
  (a) an absorber body adapted to receive liquid fuel and gas through separate ports into a mixing chamber of the absorber apparatus for absorption of the gas into the liquid fuel;
  (b) a vortex forming system adapted to generate a vortex of the gas and fuel droplets in the mixing chamber to maximize surface contact of the gas and the droplets;
  (c) an evacuation tube to remove and recirculate unabsorbed gas and fuel vapors from the mixing chamber, wherein the evacuation tube includes a central tube extending up through the mixing chamber for removal of free gas and fuel vapors therefrom, and a recirculating line to convey the free gas and fuel vapors to a gas tangential inlet port, wherein the recirculating line includes a bleed line to deliver a part of the recirculation gases to an air intake duct of an internal combustion chamber;
  (d) a reservoir in the absorber body to collect gasified fuel generated in the absorber body; and
  (e) a control valve to control the level of the gasified fuel in the reservoir.

* * * * *